United States Patent [19]

Hartman

[11] Patent Number: 4,484,256
[45] Date of Patent: Nov. 20, 1984

[54] CONSTANT CURRENT DENSITY HIGH VOLTAGE POWER SUPPLY

[75] Inventor: John T. Hartman, Rochester, N.Y.

[73] Assignee: Xerox Corporation, Stamford, Conn.

[21] Appl. No.: 366,253

[22] Filed: Apr. 7, 1982

[51] Int. Cl.³ .......................................... H02M 3/335
[52] U.S. Cl. .................................................. 363/26
[58] Field of Search ................... 363/25, 26, 41, 79, 363/80, 86, 97, 21

[56] References Cited

U.S. PATENT DOCUMENTS

| | | |
|---|---|---|
| 3,670,234 | 6/1972 | Joyce . |
| 3,701,937 | 10/1972 | Combs . |
| 3,742,330 | 6/1973 | Hodges et al. ................ 363/41 |
| 4,005,352 | 1/1977 | Kugler et al. ................ 363/26 |
| 4,025,863 | 5/1977 | Higuchi et al. . |
| 4,121,282 | 10/1978 | Ohsawa ........................ 363/41 |
| 4,150,424 | 4/1979 | Nuechterlein . |
| 4,244,015 | 1/1981 | Beebe ........................ 363/97 X |
| 4,272,806 | 6/1981 | Metzger ...................... 363/21 |
| 4,330,816 | 5/1982 | Imazeki et al. .............. 363/21 X |
| 4,371,917 | 2/1983 | Bator ........................ 363/97 X |

Primary Examiner—William M. Shoop
Attorney, Agent, or Firm—Robert E. Cunha

[57] ABSTRACT

A pulsed high voltage variable duty cycle current generator is described. One embodiment comprises a constant current power supply cyclically driving either one or both halves of a transformer primary. The transformer primary is polarized so that there is a secondary current output pulse proportional to the value of primary current only when one half of the primary is driven. The secondary current is rectified, and the average dc secondary current valve is used to control the primary driver duty cycle so that the secondary average current is maintained at a predetermined level. Thus, the output is a series of current pulses where the output peak value is determined by the amount of constant primary current and the output average value is determined by the output duty cycle. A second embodiment is disclosed where the peak output current is controlled by the duty cycle of the primary high frequency current pulses and where the output duty cycle is controlled by turning the primary circuit on and off at a low frequency at an adjustable duty cycle.

3 Claims, 8 Drawing Figures

TO FIGURE 4B

CONSTANT CURRENT DENSITY HIGH VOLTAGE POWER SUPPLY

This invention is a high voltage power supply for generating current pulses. This circuit automatically controls the peak current output to a specific level, and varies the average current output by varying the output duty cycle.

In a xerographic copier, components such as the corotron require a voltage high enough to provide the component with sufficient instantaneous current density for proper operation, without exceeding a maximum average current value. If the required current density is greater than the desired average current, a chopped current at an appropriate duty cycle is required. The typical power supply for this use produces a high voltage pulse at a fixed duty cycle, and varies the voltage to obtain the correct average current value. The disadvantage of this typical circuit is that it must be designed to withstand the highest expected voltage. For example, if the expected range of output voltage is from 5 to 10 Kv, the system must be designed for 10 Kv.

This invention establishes a certain voltage, and achieves a range of currents by varying the duty cycle. Thus, for example, the voltage can be set to 5 Kv and the duty cycle varied from 50 to 100%. This provides the same range of average current and maintains the required minimum current density, but allows the power supply and the load to be designed for half the peak voltage.

The circuit for generating this variable duty cycle output comprises a constant current generator coupled to the center tap of a transformer primary. A sensing resistor at the primary senses the primary current. This voltage is then fed back to the constant current generator to close the loop. Because the circuit output peak current is determined by the primary current, this primary circuit determines the power supply current pulse amplitude.

To vary the output duty cycle, the average current at the secondary is sensed to control a modulator which drives two power transistors, each controlling half of the primary winding. When both transistors are on, there is no circuit output. When either transistor is on, a circuit output current pulse will be produced. Both transistors are never off at the same time. To summarize, the circuit output is a rectangular current waveshape, the amplitude determined by the amount of constant current at the primary, and the duty cycle determined by the amount of average current at the secondary.

A second embodiment uses a power transistor to drive pulses of current through a transformer primary at a high frequency. A diode in series with the secondary allows secondary current when the transistor is cut off. The secondary current is then filtered to provide a steady peak value. The secondary current is sensed and fed back to vary the transistor duty cycle, thus controlling the output peak current. This will be recognized as a conventional fly-back design.

This peak current is shaped into pluses by cutting off the transformer for the duration of the off time of each duty cycle. The duty cycle is generated by an adjustable pulse width modulator and is used to cut off the high frequency current pulses to the transformer.

In either circuit, the output is a series of current pulses, the peak current value and the duty cycle of which can be controlled to produce a variable average current which is a function of a variable duty cycle.

DETAILED DESCRIPTION OF THE DRAWINGS

Figure 1:
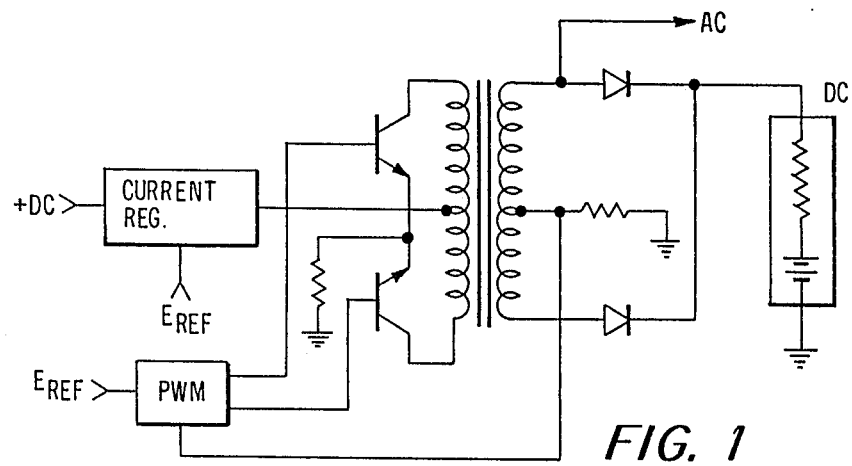
FIG. 1 is a simplified block diagram of one embodiment.

FIG. 1 is a simplified block diagram of one embodiment of the invention. Current regulator 10 generates a constant current which is applied to the center tap of transformer 11. The possibilities are (1) transistor 12 conducts and transistor 13 is cut off, (2) transistor 13 conducts and transistor 12 is cut off, and (3) both transistors 12 and 13 conduct. Both transistors cannot be cut off at the same time since the current from regulator 10 must have at least one path through either transistor and through resistor 14 to ground.

When both transistors are conducting, the currents in each half of the transformer 11 cancel and there is no output. If one transistor is conducting, there will be an output current pulse through either diode 15 or 16 to produce a dc current pulse through the load 17 shown in equivalent form as a resistor 18 and a battery 19. If an ac high voltage is also required from this power supply, it may be taken directly from the transformer 11 secondary as shown.

The current pulse amplitude is determined by the amount of current regulator output while the duty cycle is determined by the pulse width modulator 20. One input to the modulator 20 is an average voltage from current sensing resistor 21. This is compared to a reference E ref at the modulator 20 which, then, produces pulses of the appropriate timing to either increase or decrease the duty cycle at transistors 12, 13. This modulator 20 is an off-the-shelf LM 1524 device manufactured by National Semiconductors, among others. For greater detail, see FIGS. 4 and 5 below or the manufacturer's part specification.

Figure 2:
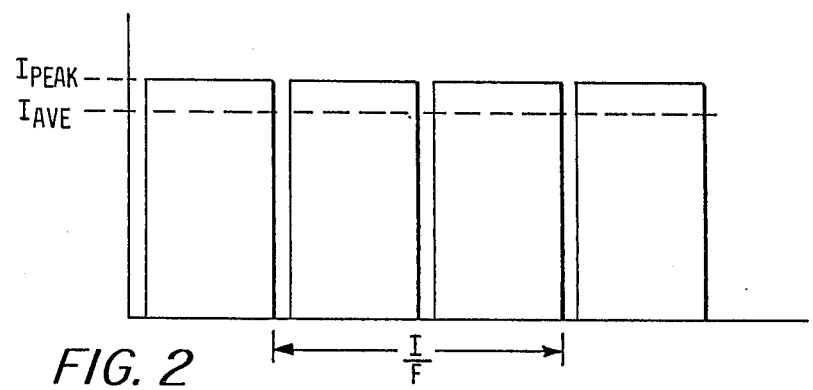
FIGS. 2 and 3 are representative current waveshapes.
Figure 3:
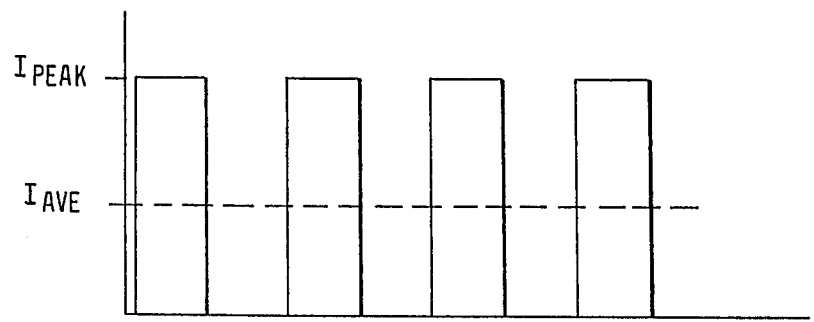

To summarize, the output of the FIG. 1 circuit is a series of rectangular current pulses, the peak amplitude controlled by the current regulator 10 and the duty cycle (and therefore, average current) controlled by the modulator 20. FIG. 2 shows a representative waveshape where the average current is close to the peak current while FIG. 3 shows a representative waveshape where the average current is much lower than the peak current.

Figure 4A:
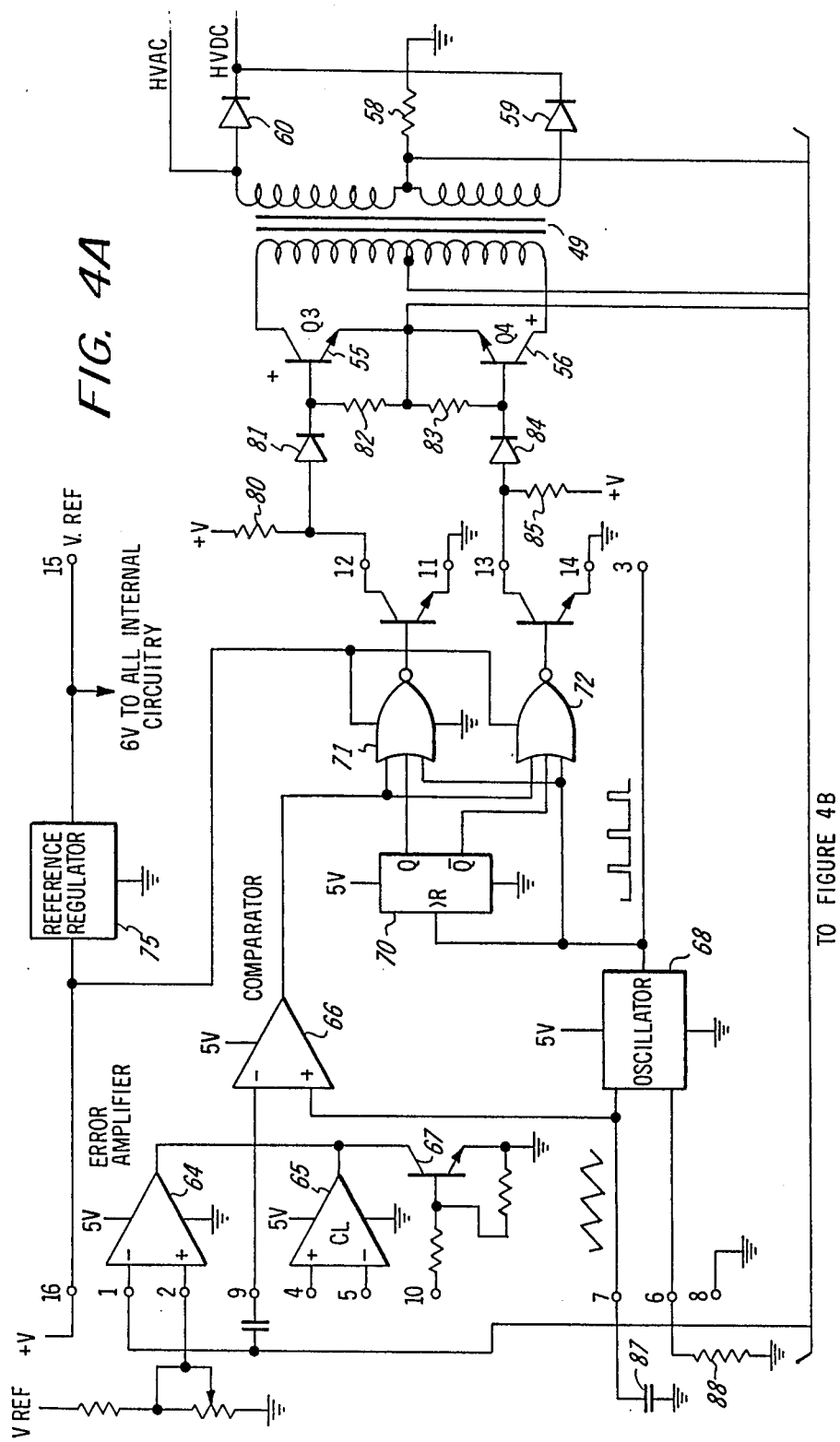
FIGS. 4A, 4B, and 5A-5C are schematic diagrams of two embodiments of the circuit.
Figure 4B:
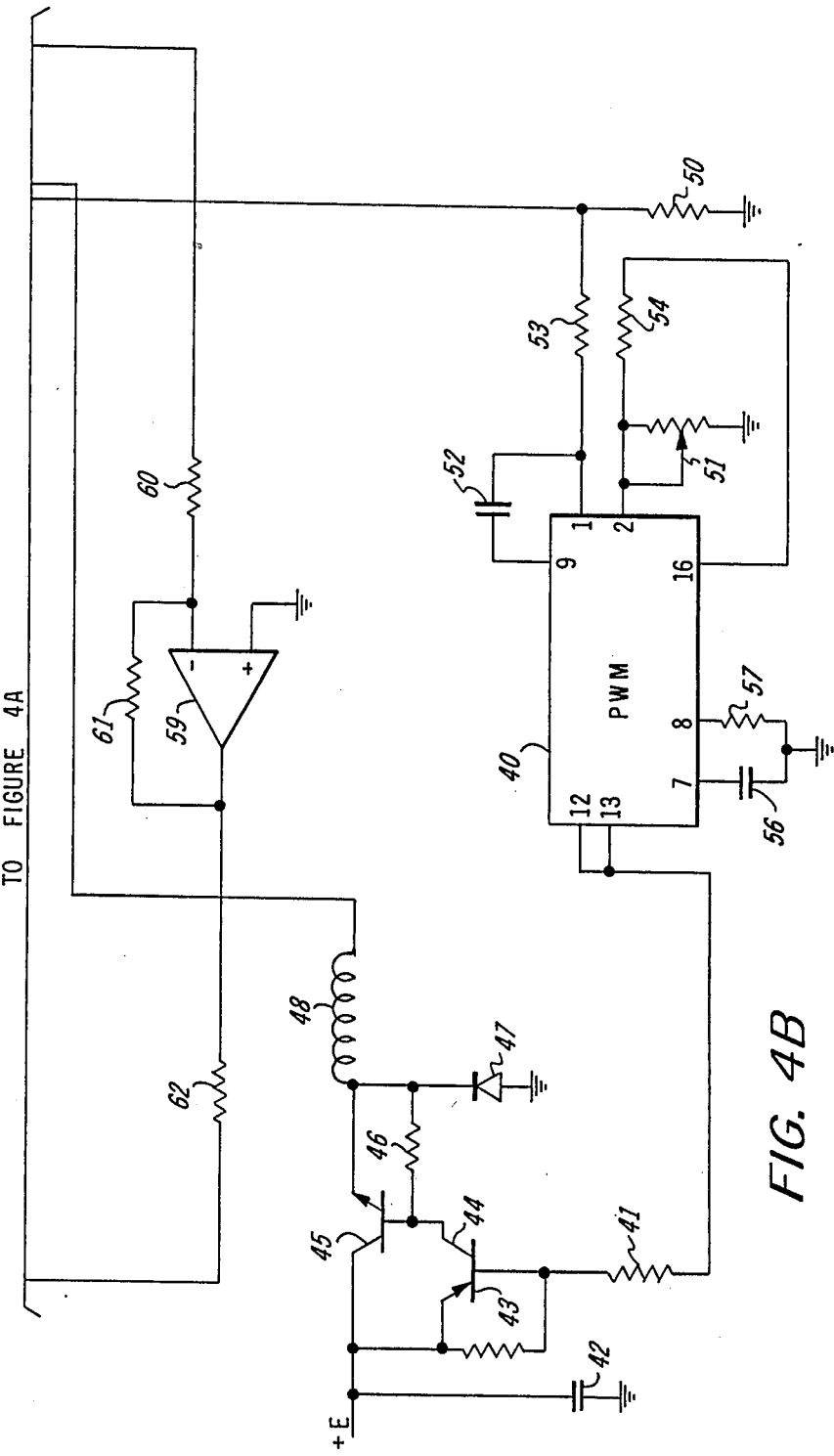

FIG. 4 is a detailed circuit diagram of one embodiment of this invention. Modulator 40 produces a twenty to fifty KHz square wave which is amplified in the circuit comprising resistor 43, transistor 44, and resistor 46 to turn the main chopper transistor 45 on and off. This couples the input voltage +E, filtered by capacitor 42, through to the inductor 48. During the time that transistor 45 is cut off, the inductor 48 current continues to flow through diode 47. The output, which appears at the transformer 49 primary center tap, therefore, is a constant current. A +E input voltage of 24 volts and an inductor 48 current value of one amp at twelve to twenty volts would be typical.

Either transistor 55 or 56, or both, will be conducting through resistor 50 to ground, generating a current sensing voltage of, typically, two to three volts, at resistor 50 which is coupled to modulator 40, pin 1, through resistor 53. Capacitor 52 filters this voltage. This current sensing voltage is compared at modulator 40 with a 5 volt reference voltage, E ref, which is generated by the modulator 40 and is applied at modulator 40 pin 2, adjustable through resistors 51, 54. If the sensed resistor 50 voltage, and therefore, the transformer 49 primary current, is too high or low, the modulator 40 output duty cycle at pins 12, 13 will be modified to correct it. The basic frequency of modulator 40 is determined by capacitor 56 and resistor 57.

In the transformer 49 secondary, the center tap is returned to ground through sensing resistor 58. High voltage ac is available directly from the secondary and high voltage dc is available through diodes 59, 60. Typical high voltages are five to ten thousand volts, peak. In xerographic equipment, the dc voltage would be used for the charge and transfer functions and the ac would be used for the detack and pre-clean functions.

The sensed voltage at resistor 58 is amplified in operational amplifier 59 implemented with resistors 60 and 61 to form a multiplier circuit. Then it is filtered by resistor 62 and capacitor 63 before being applied to error amplifier 64, pin 1. The other error amplifier input, pin 2, is connected to a reference voltage produced by resistors 76 and 77. Because capacitor 63 is connected between the amplifier's input and output pin, the amplifier 64 acts as a capacitive circuit, resulting in an output slew rate which is a function of the error magnitude.

That portion of the circuit comprising error amplifier 64, current limiter CL 65, comparator 66, oscillator 68, flip-flop 70, regulator 75, gates 71, 72 and transistors 73, 74 are all internal parts of the pulse width modulator part number LM1524, but are shown separately to aid in the understanding of the circuit operation. The current limiting circuit, comprising amplifier 65 and transistor 67, is provided as part of the modulator device but is not used in this circuit. The power supply voltage +V, which need not be well regulated, is applied to an internal reference regulator 75 to produce a precision voltage which is used as the reference voltage V ref.

The internal oscillator 68 generates a set of ramp waveshapes which are compared to the error amplifier 64 output at the comparator 66, resulting in a variable duty cycle rectangular wave output. At the same time, the oscillator 68 produces a synchronized set of timing pulses which are coupled through flip-flop 70. Both of these signals are then NANDed in gates 71, 72 to produce the final timing signals which are amplified in transistors 73, 74 and applied to power transistors 55, 56 which drive the transformer 49 primary. Resistors 80, 82, 83 and 85, along with diodes 81, 84 comprise an inverting network which prevents both transistors Q3, Q4 from being cut off at the same time.

The frequency of the oscillator is determined by capacitor 87 and resistor 88, and is typically between 50 and 300 Hz.

Figure 5A:
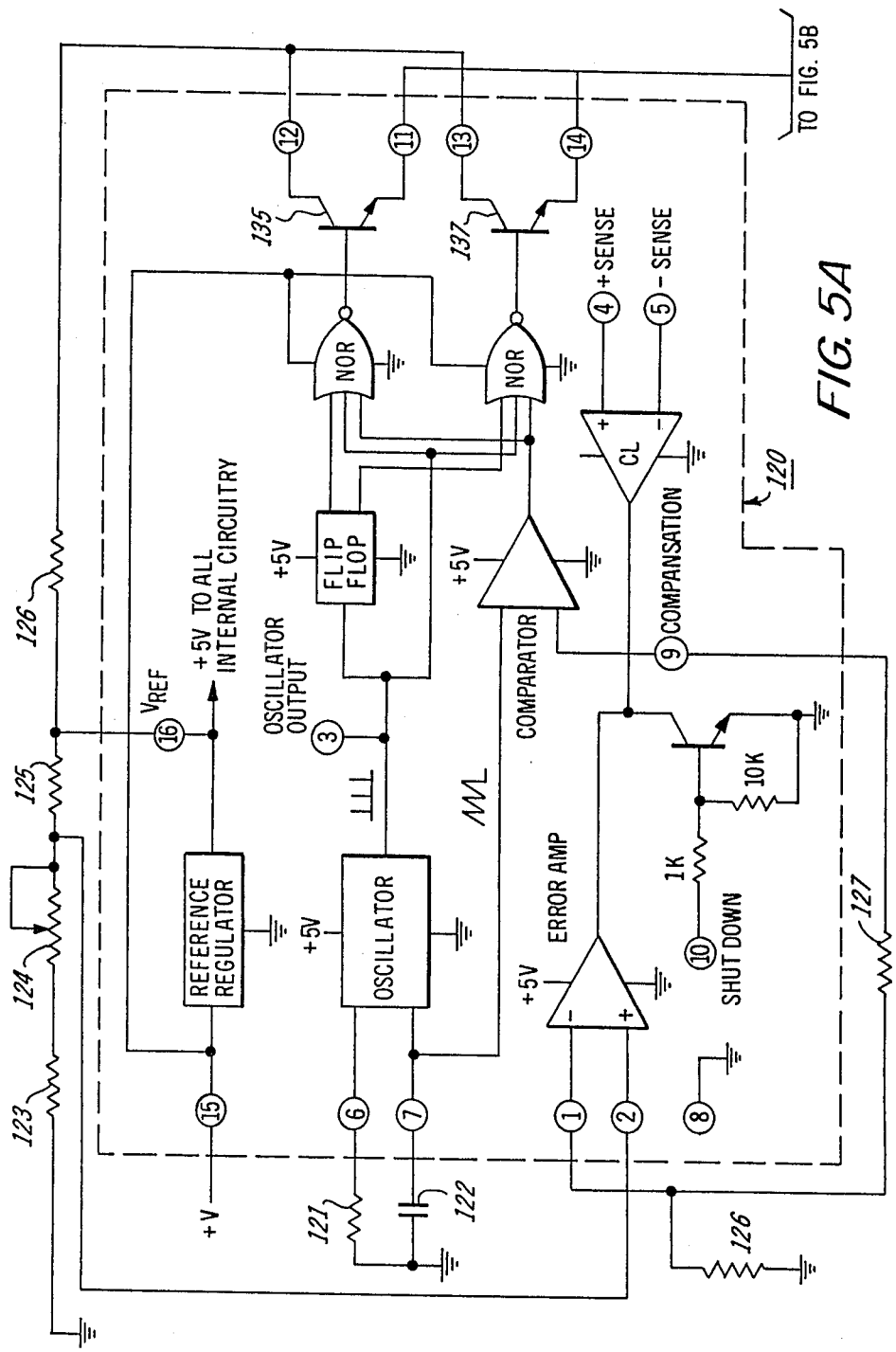
Figure 5B:
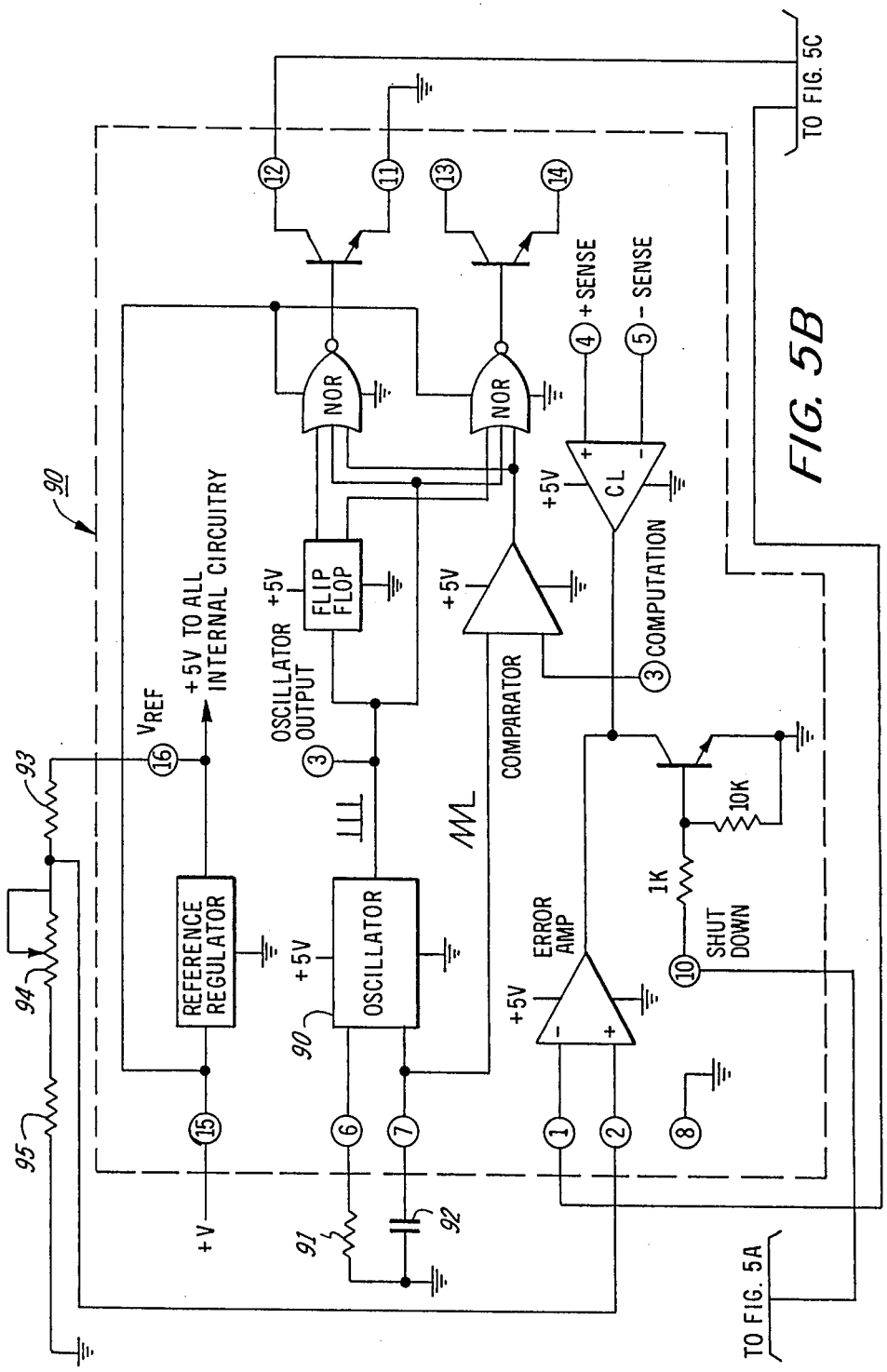
Figure 5C:
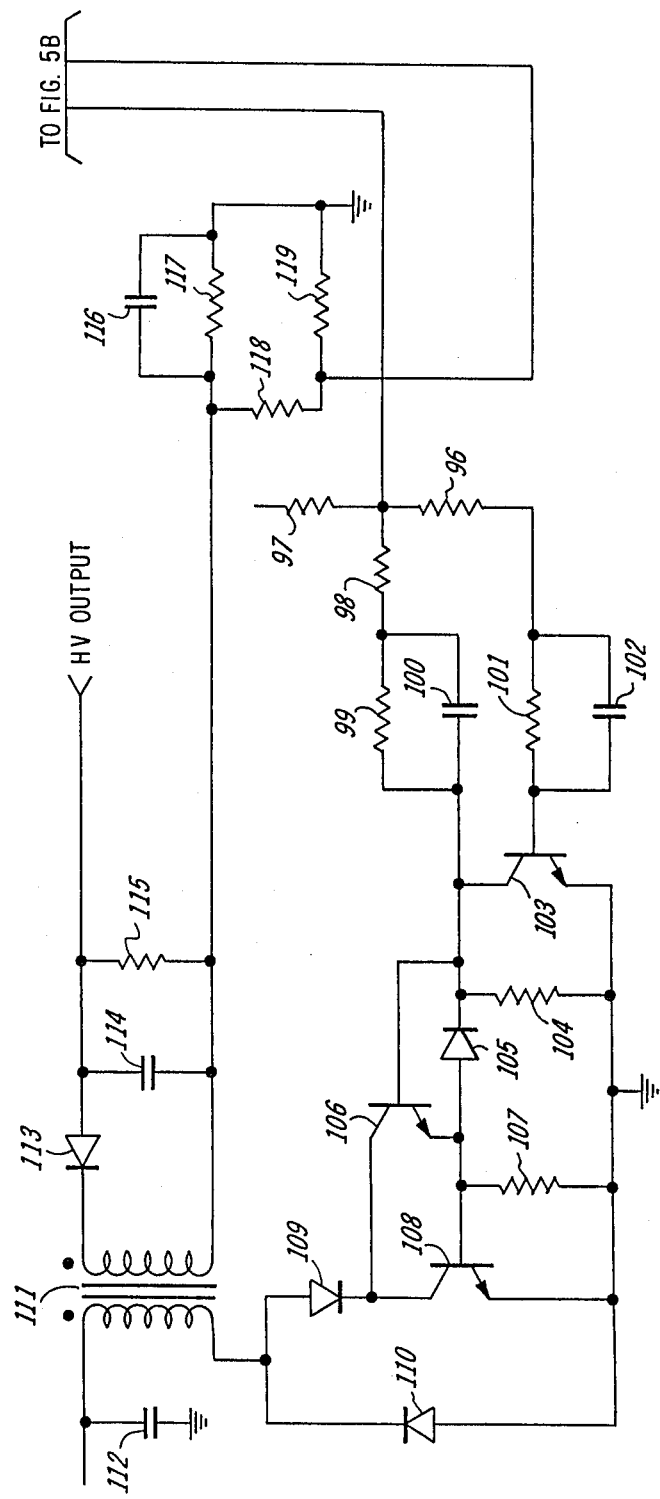

FIG. 5 is a schematic of an alternate embodiment. The frequency of the modulator 90 oscillator is set by resistor 91 and capacitor 92 to about 15 to 30 KHz. The rectangular wave output at modulator 90 pin 12 must be amplified by transistors 106 and 103, and supporting capacitors 100, 102, resistors 96, 97, 98, 99, 101, 104, 107, and diode 105 to drive power transistor 108. As shown, there is either current in one direction in the transformer 111 primary when the transistor 108 is conducting, or there is no current when transistor 108 is cut off. Capacitor 112 filters the input voltage to the transformer, diode 109 protects transistors 108 and 106 from negative spikes that may be generated by the transformer 111, and diode 110 will conduct negative spikes to ground.

Because of diode 113 and the transformer 111 winding polarities, secondary current only flows when the primary is turned off. This pulse of current in the secondary is rectified by diode 113 and filtered by capacitor 114 and resistor 115 to produce a high voltage dc output.

The output current is sensed by a resistor network comprising resistors 118 and 119 to produce a voltage which, after filtering by resistor 117 and capacitor 116, is coupled to pin 1 of modulator 90. Here it is compared to a variable reference voltage generated by resistors 93, 94 and 95 which are connected between the modulator 90 reference voltage output pin 16 and ground. The comparison is made at the modulator 90 error amplifier which, as described above, varies the modulator 90 output duty cycle. The result is that the peak current at the high voltage output is regulated by varying the duty cycle of the transistor 108 which drives the transformer primary.

This current will remain at this steady peak value until modulator 90 receives a high Shut Down signal at pin 10 which is produced by modulator 120. This modulator 120 is set to a frequency of 200 to 400 Hz by resistor 121 and capacitor 122.

The duty cycle of modulator 120 is set by first generating a voltage from a resistor divider comprising resistors 123, 124 and 125, and amplifying it in a multiplier comprising the modulator 120 error amplifier and resistors 126 and 127. The resultant voltage is applied to the modulator 120 comparator and compared against the oscillator ramp waveshape to produce a variable duty cycle waveshape which is a function of the variable resistor 124 setting. Finally, this waveshape is used to couple the V ref output of the reference regulator through resistor 126 and transistors 135 and 137 to the Shut Down, pin 10, input to modulator 90.

The overall result of this entire circuit is to supply a series of rectangular current pulses, the duty cycle determined manually by the resistor 124 setting, and the current level during "on" time by the automatic regulation of the current value sensed at the transformer secondary.

A comparison of the FIG. 4 and FIG. 5 circuits shows that the duty cycle of the output current pulses can be set either manually or automatically as a function of secondary average current. Also, the output peak current level can be controlled automatically by regulating either the primary average current or the average secondary current while the power supply is not shut down. In both cases, the peak current and duty cycle are variable.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

I claim:

1. A power supply which converts a dc voltage input into a series of relatively lower frequency rectangular current regulated variable duty cycle output pulses comprising:

a transformer comprising a primary and a secondary,
means for periodically inducing relatively higher frequency current pulses into said primary,
means for rectifying and filtering the secondary voltage which is in the form of said relatively higher frequency pulses to produce a dc current,
means responsive to the instantaneous current in said secondary for varying the amplitude of the primary current pulses to regulate the output current, and
means for periodically disabling said pulses at said primary at a relatively lower frequency to produce a relatively lower frequency rectangular current waveshape at said secondary output.

2. The power supply of claim 1 wherein said means for varying controls the duty cycle of the primary current pulses.

3. The power supply of claim 1 wherein said means for disabling can be adjusted to vary the duty cycle at the output of the power supply, thereby varying the average output current without varying the instantaneous output current.

* * * * *